June 1, 1926.

J. E. MARSDEN 1,587,167

REFRIGERATOR RECEPTACLE

Filed Feb. 11, 1925

INVENTOR
J. E. Marsden
BY
Geo. L. Beeler
ATTORNEY

Patented June 1, 1926.

1,587,167

UNITED STATES PATENT OFFICE.

JOHN E. MARSDEN, OF PHILADELPHIA, PENNSYLVANIA.

REFRIGERATOR RECEPTACLE.

Application filed February 11, 1925. Serial No. 8,362.

This invention relates to household or storage receptacles and has particular reference to covered receptacles or dishes for holding food stuffs in storage and particularly in ice boxes or refrigerators.

Among the objects of the invention is to provide a receptacle or dish so constructed as to be not only most convenient for storage purposes, but also highly economical, having in view the capability of conserving many left-overs for future use that frequently are discarded or wasted, and also to provide means for the convenient assembly of a number of such receptacles one on top of another for conservation of space and to enable the house-keeper or cook to keep the different foods properly separated from one another and also to keep them in the most sanitary condition.

A still further object of the invention is to provide a receptacle of such design as to insure that the tops and bottoms thereof are counter parts or interchangeable so that the bottom of any receptacle may serve as the lid or cover of another receptacle of the same type, and for proper aeration or ventilation when desired.

With the foregoing and other objects in view the invention consists in the arrangement and combination of parts hereinafter described and claimed, and while the invention is not restricted to the exact details of construction disclosed or suggested herein, still for the purpose of illustrating a practical embodiment of the invention reference is had to the accompanying drawings in which like reference characters designate the same parts in the several views, and in which—

Figure 1:
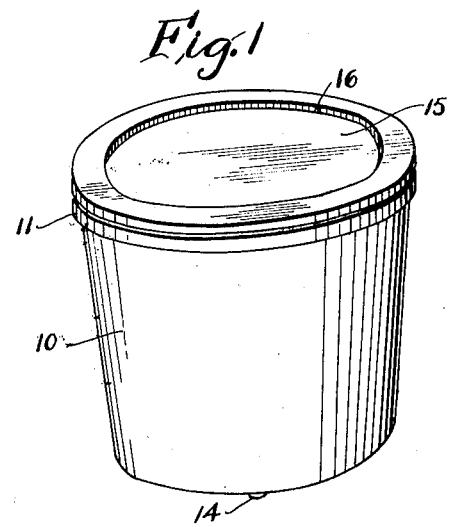
Figure 1 is a perspective view of one design of my improvement.
Figure 2:
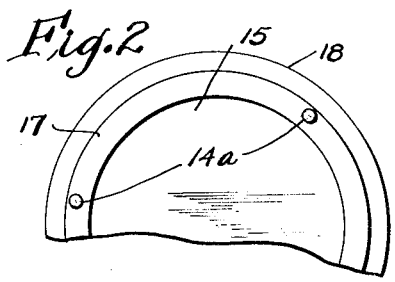
Fig. 2 is a bottom plan view of the lid therefor.

Referring now more specifically to the drawings the receptacle 10 of Fig. 1 may be thought of as cylindrical or drum shape, but with a slight flare to facilitate the manufacturing process and also to facilitate the nesting action to be described shortly. This body 10 is formed with an open top bounded by a rim 11 with an internal rabbet 12 forming a seat or ledge. The inner and outer walls of the body 10 will be thought of as being substantially straight and smooth below this rim. The bottom 13 is a counter part of the seat aforesaid. In other words, the form and diameter thereof are such that the bottom 13 of any receptacle will fit directly into the seat 12 of another receptacle of the same type or design so as to constitute a lid for such under receptacle. While the bottom aforesaid may be substantially flat and the seat likewise is preferably flat, in order to insure proper aeration or ventilation for the receptacle, I provide on one or the other of these parts slight projections or lugs 14 indicated as formed upon the edge portion of the lower surface of the bottom 13 so as to contact with the seat 12 of the companion receptacle. This insures a slight air space between the two receptacles, it being understood that the lateral fit between one receptacle bottom and the seat of the supporting receptacle will be loose enough to insure such ventilation.

Figure 5:
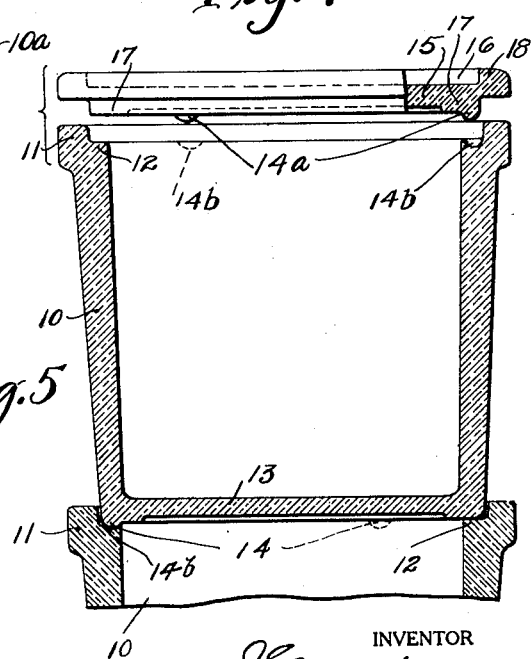
Fig. 5 is a vertical section showing more specifically the structural features and how the several receptacles nest one into another and indicating also the relation of the lid thereto. This sectional view may be regarded as pertinent to either of the two forms shown in Figs. 1 and 3.

I provide a lid 15 for each receptacle, or as many lids as may be required in any set of receptacles so that there shall be at least a lid for the uppermost receptacle of any tier. It will be understood, however, that each receptacle may have its own lid if desired and when so employed and stacked one upon another the bottom of any receptacle may nest within a depression 16 formed in the upper surface of the lid 15 and thereby will be held from slipping laterally. Each lid is provided with a rib 17 spaced uniformly from the extreme periphery 18 of the lid and so constructed as to constitute in size and form the counter part of the seat 12 or to be similar to the bottom portion of a receptacle as above described. This rib 17 consequently is provided with lugs 14ᵃ to rest upon said seat for the purpose already indicated. It will be understood also that the lugs might be formed upon said seat and extend upward for a similar purpose if preferred. Fig. 5 shows clearly how these receptacles may nest interchangeably with one another and with the lids.

Figure 4:
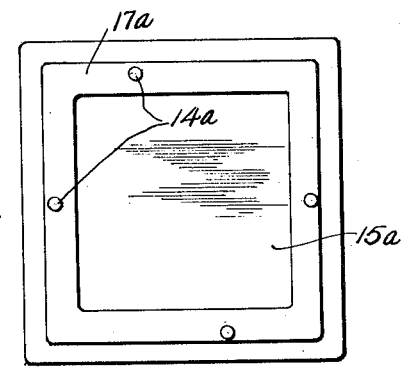
Fig. 4 is a bottom plan view of the lid therefor.
Figure 3:
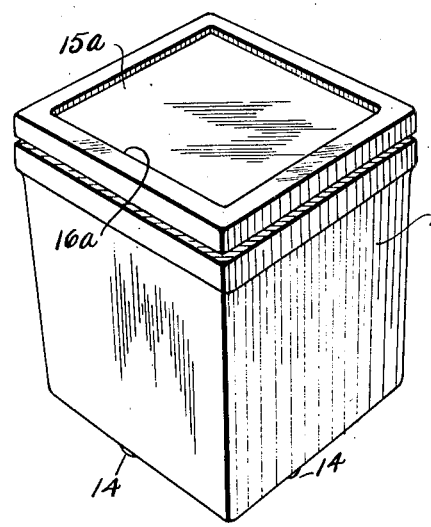
Fig. 3 is a perspective view of a modified design.

The form of the invention in Figs. 3 and 4 is of rectangular instead of round shape and comprises a body 10ª and a similarly shaped lid 15ª, but having otherwise the same characteristics as described in detail above, and so consequently the view of Fig. 5 may be understood as being pertinent to either the round or square form in so far as the mating or nesting action of the lids and receptacles is concerned. The lugs 14ª formed on the lower surface of the rib 17ª are preferably four in number, one for each side, while in the round structure I prefer to employ only three of the lugs 14 or 14ª for more suitable steady support. This form of structure has provided in the lid 15ª a depression 16ª for supporting another receptacle and holding it from lateral movement.

Figure 6:
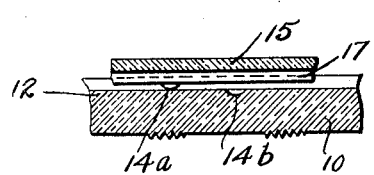
Fig. 6 is a fragmentary detail pertaining to the nesting of the lid or cover.

For certain food stuffs kept in storage it is desirable to prevent the circulation of air and to make a more hermetic seal. To this end by providing in the bottom of the seat 12 a plurality of pits 14ᵇ suitably spaced to receive the lugs 14ª, the lid will fit snugly upon the bottom of the seat, but to secure ventilation the lid may be rotated slightly to bring the lugs upon the flat portion of the seat as shown in Fig. 6. In the square form of the construction the same result,— namely, the tight or loose fit, may be provided by arranging the lugs 14ª on two opposite sides at the centers of the sides while the other two are offset from the center of the sides. By arranging the pits 14ᵇ in the rim portion of the receptacle space to correspond to the arrangement of the lugs 14ª as just described, the lid will fit tightly, but to provide for the ventilation the lid will be turned a quarter so that all the lugs will rest upon the flat bottom of the seat. However, when the rectangular form is made and used with sides longer than ends, the lid must be given a half turn or from end to end, and the mating lugs and pits must be staggered accordingly.

I claim:

1. In storage receptacles as set forth, the combination of a body having a seat and a cover having a portion fitted loosely into said seat to prevent lateral displacement of the cover, said cover and seat being provided with mating projections and pits to afford a closely fitting seal, said projections serving when shifted from the pits to hold the cover slightly elevated for ventilation.

2. In storage receptacle as set forth, the combination of a body having an angular seat, and a cover having an angular portion fitting into said seat to prevent lateral displacement and rotation of the cover, said cover and seat being provided with mating projections and pits which permit said cover to seal said body closely, but said projections being so arranged with respect to the pits as not to fit thereinto when the cover is turned through a predetermined angle after being removed from the seat and again engaged with the seat causing the projections to rest upon said seat whereby a free space is provided between the body and the cover for ventilation of the body.

In testimony whereof I affix my signature.

JOHN E. MARSDEN.